(12) United States Patent
Wu

(10) Patent No.: US 12,330,585 B1
(45) Date of Patent: Jun. 17, 2025

(54) SEAT BELT ANCHOR

(71) Applicant: TAIWAN RACING PRODUCTS CO., LTD., Changhua County (TW)

(72) Inventor: Wen-Yuan Wu, Changhua County (TW)

(73) Assignee: TAIWAN RACING PRODUCTS CO., LTD., Dacun Township, Changhua County (TW)

( * ) Notice: Subject to any disclaimer, the term of this patent is extended or adjusted under 35 U.S.C. 154(b) by 0 days.

(21) Appl. No.: 18/770,851

(22) Filed: Jul. 12, 2024

(51) Int. Cl.
*B60R 22/22* (2006.01)
*B60R 22/18* (2006.01)

(52) U.S. Cl.
CPC ...... *B60R 22/22* (2013.01); *B60R 2022/1812* (2013.01)

(58) Field of Classification Search
CPC . B60R 22/22; B60R 22/18; B60R 2022/1812; B60R 2022/1806; B60N 2/2887
See application file for complete search history.

(56) References Cited

U.S. PATENT DOCUMENTS

| | | | | |
|---|---|---|---|---|
| 3,598,443 | A * | 8/1971 | Stoffel | A44B 11/2549 297/483 |
| 8,641,096 | B1 * | 2/2014 | Kohlndorfer | B60R 22/28 280/805 |
| 2004/0232690 | A1 * | 11/2004 | Fuji | B60R 21/01516 280/801.2 |
| 2010/0013282 | A1 * | 1/2010 | Balensiefer | B60N 2/2887 297/253 |

FOREIGN PATENT DOCUMENTS

| | | | |
|---|---|---|---|
| EP | 0572300 A1 * | 12/1993 | ............. B60R 22/26 |
| EP | 1459641 A2 * | 9/2004 | ......... A44B 11/2534 |
| JP | H0249171 Y2 * | 12/1990 | ............. B60R 22/24 |

OTHER PUBLICATIONS

Author Unknown, Title Not Available, Dec. 25, 1990, Google Patents, JP H0249171 Y2, Machine Translation of Description (Year: 1990).*

* cited by examiner

*Primary Examiner* — Paul N Dickson
*Assistant Examiner* — Matthew D Lee
(74) *Attorney, Agent, or Firm* — MUNCY, GEISSLER, OLDS & LOWE, P.C.

(57) ABSTRACT

A seat belt anchor is provided, wherein the seat belt anchor includes: a main body including a locking slot having an opening and an inner surface; and a locking member movably connected to the main body and movable between a lock position and a release position; wherein when the locking member is in the lock position, the locking member projects toward the locking slot to define a distance between the inner surface of the locking slot and the locking member which is larger than a diametric dimension of a shaft body of the fastener so that it allows the shaft body of the fastener to axially pass through the locking slot; wherein when the locking member is in the release position, it allows a ring body of the fastener to directly pass through the opening to be in the locking slot.

9 Claims, 7 Drawing Sheets

SEAT BELT ANCHOR

BACKGROUND OF THE INVENTION

Field of the Invention

The present invention relates to a seat belt anchor.

Description of the Prior Art

Safety belts and seat belts are used to reduce collisions or impacts, and to prevent people from injuries during riding or driving vehicles and other means of transportation. Safety belts or seat belts can hold drivers and passengers in their seats, prevent them from being thrown away, and reduce the occurrence of injuries.

A safety belt or seat belt should be firmly secured to the body or floor of a vehicle through a seat belt anchor to which a seat belt is connected. Generally, there are two different mounting types of the conventional seat belt anchor. The first one is that a threaded shaft body of a fastener is axially disposed through a circular through hole and crewed to the body or floor of the vehicle, to secure the seat belt anchor. The second one is that a ring body of a fastener secured to the body or floor of the vehicle is disposed through a lateral opening to be restricted, by a locking member, in a locking slot of a seat belt anchor.

However, each of the two conventional seat belt anchors can be secured to the vehicle only by one of the aforementioned two different mounting types, which has low compatibility of application and is inconvenient to install.

The present invention is, therefore, arisen to obviate or at least mitigate the above-mentioned disadvantages.

SUMMARY OF THE INVENTION

The main object of the present invention is to provide a seat belt anchor which has high compatibility of application.

To achieve the above and other objects, a seat belt anchor is provided, wherein the seat belt anchor includes: a main body including a locking slot, the locking slot including an opening opened at a side of the main body and an inner surface, the main body being configured to be mounted on a vehicle floor and to be connected to a seat belt; and a locking member movably connected to the main body and movable between a lock position and a release position; wherein when the locking member is in the lock position, the locking member projects toward the locking slot to define a distance between the inner surface of the locking slot and the locking member which is larger than a diametric dimension of a shaft body of the fastener so that it allows the shaft body of the fastener to axially pass through the locking slot; wherein when the locking member is in the release position, it allows a ring body of the fastener to directly pass through the opening to be in the locking slot.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 9 for an exemplary embodiment of the present invention. A seat belt anchor 1 of the present invention includes a main body 10 and a locking member 20.

Figure 1:
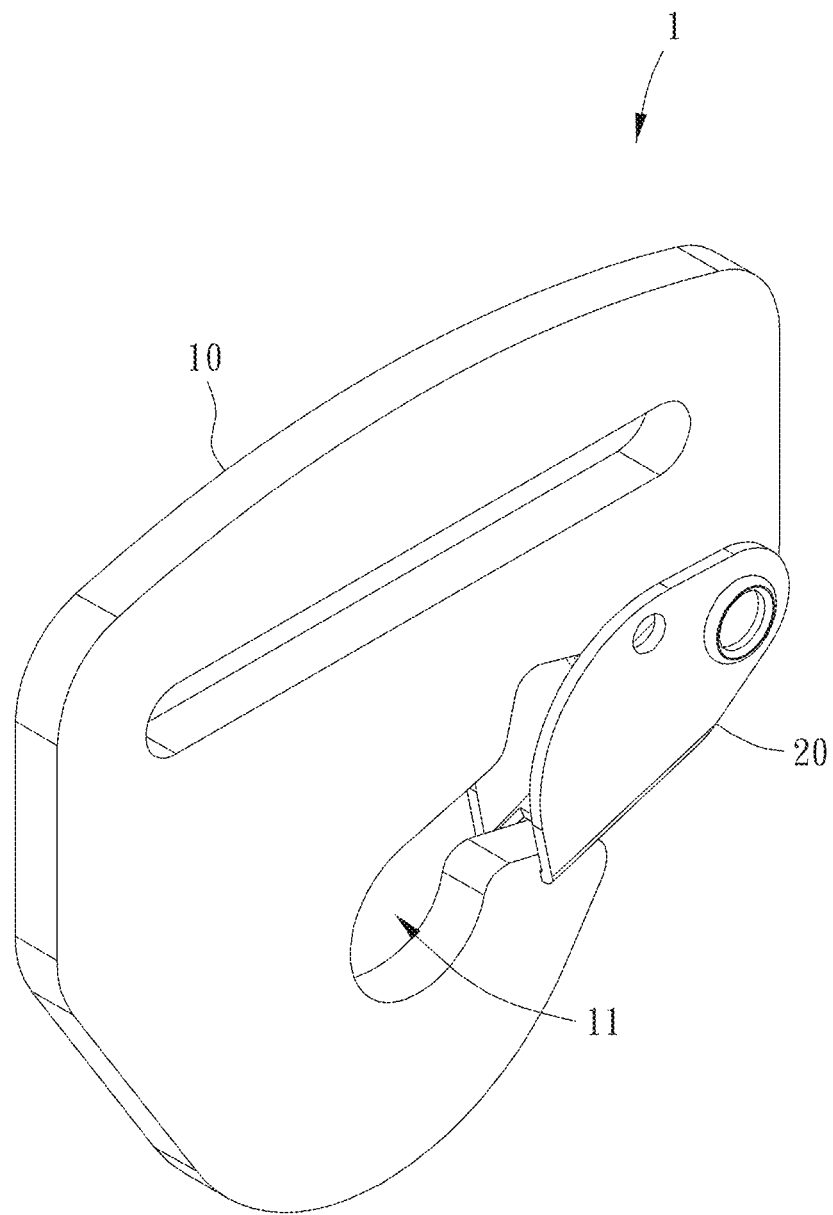
FIG. 1 is a stereogram of an exemplary embodiment of the present invention.
Figure 2:
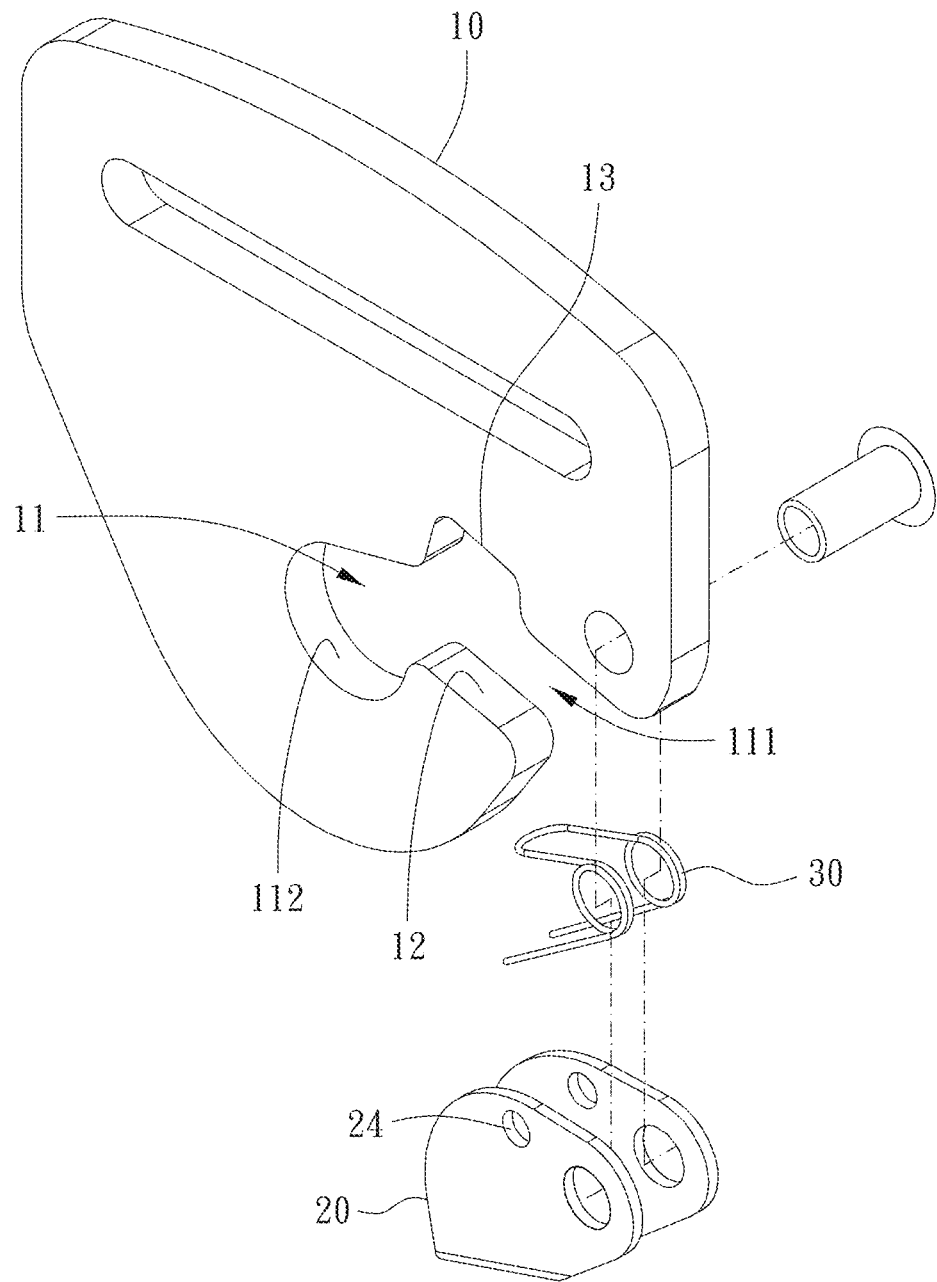
FIG. 2 is a breakdown drawing of an exemplary embodiment of the present invention.
Figure 3:
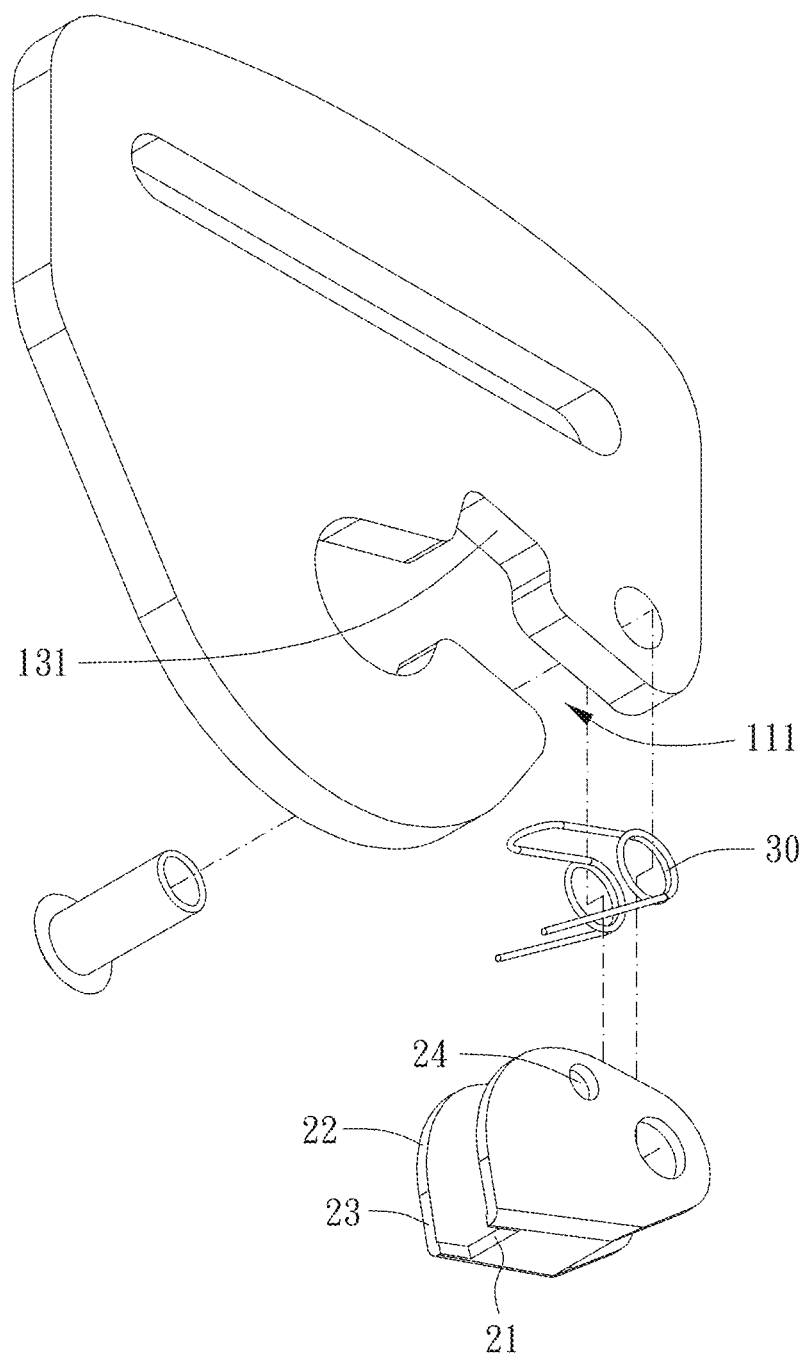
FIG. 3 is another breakdown drawing of an exemplary embodiment of the present invention.
Figure 4:
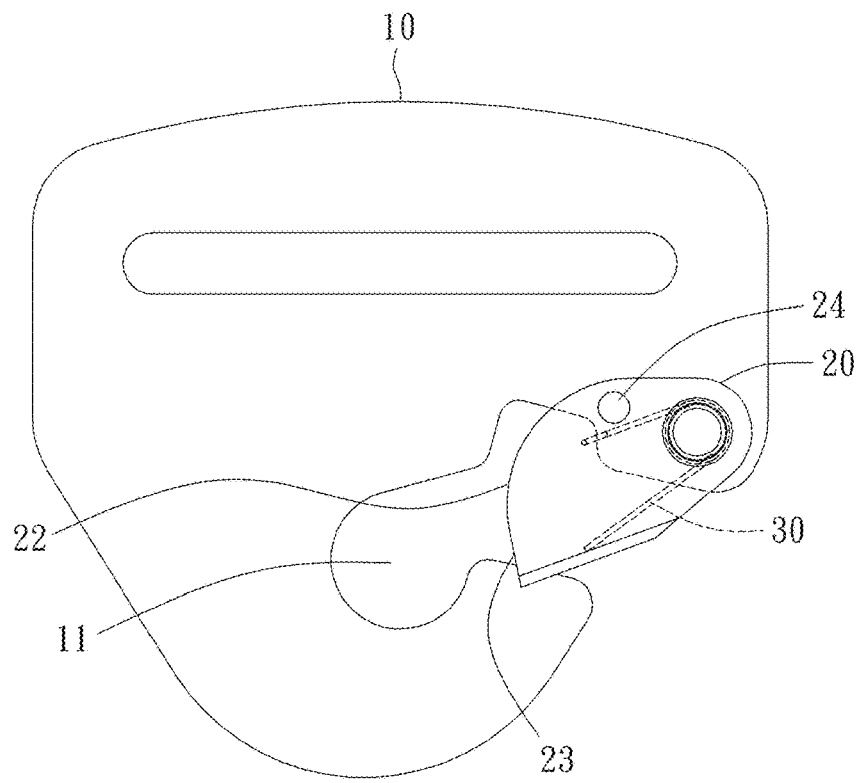
FIG. 4 is a drawing showing a seat belt anchor in a lock position according to an exemplary embodiment of the present invention.
Figure 5:
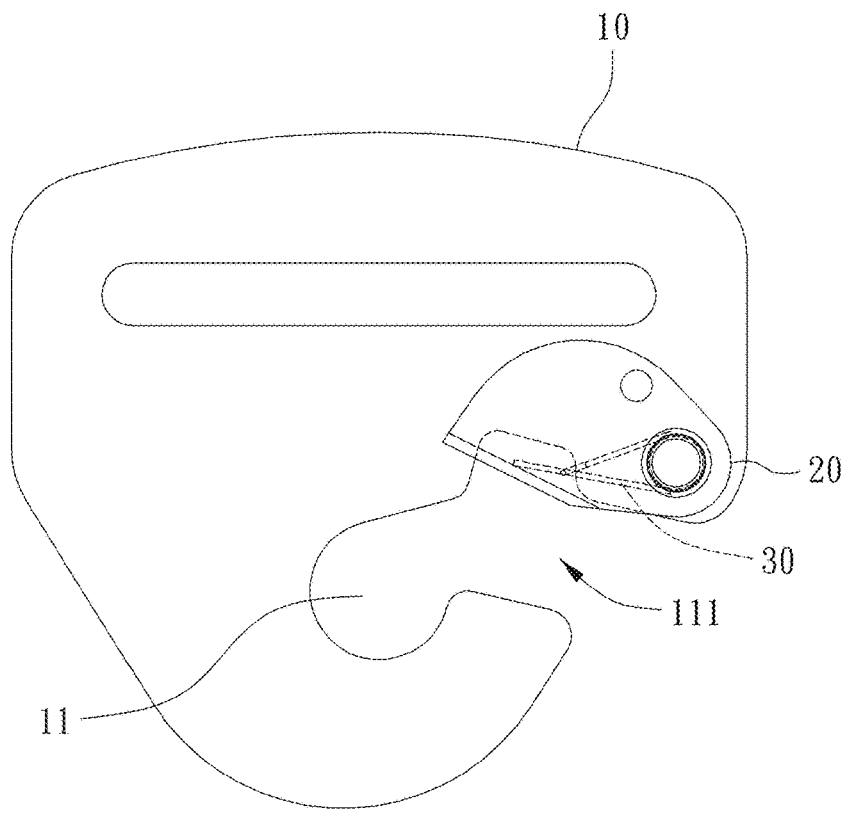
FIG. 5 is a drawing showing the seat belt anchor in a release position according to an exemplary embodiment of the present invention.
Figure 6:
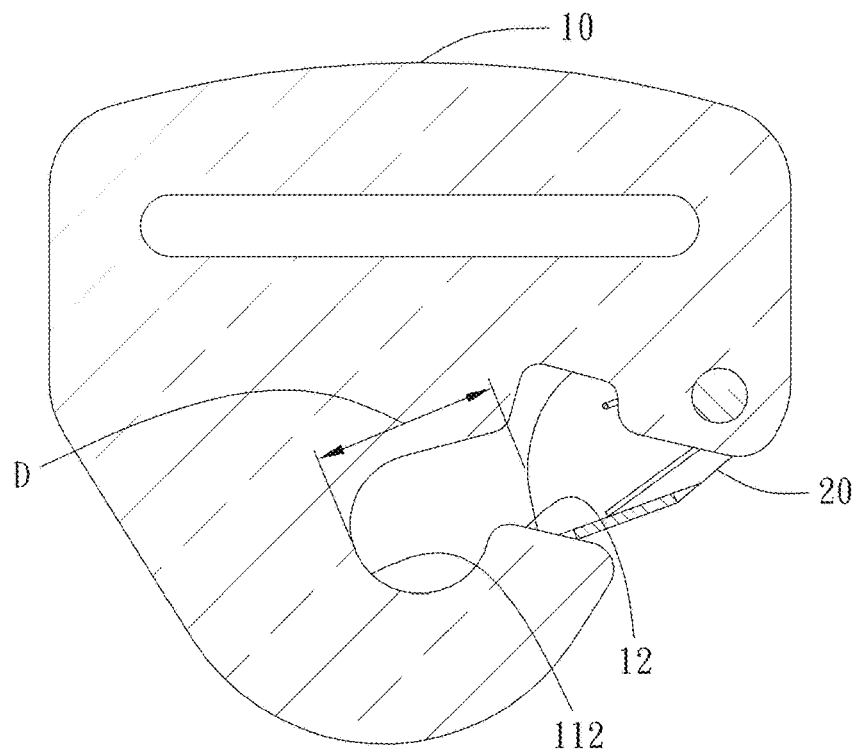
FIG. 6 is a cross-sectional view of FIG. 4.
Figure 7:
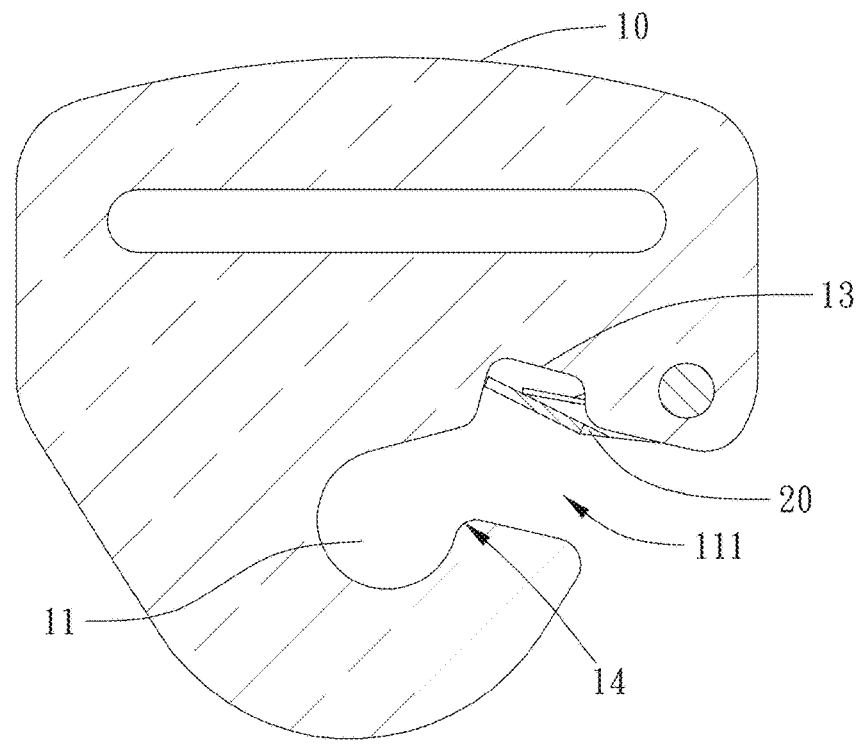
FIG. 7 is a cross-sectional view of FIG. 5.
Figure 8:
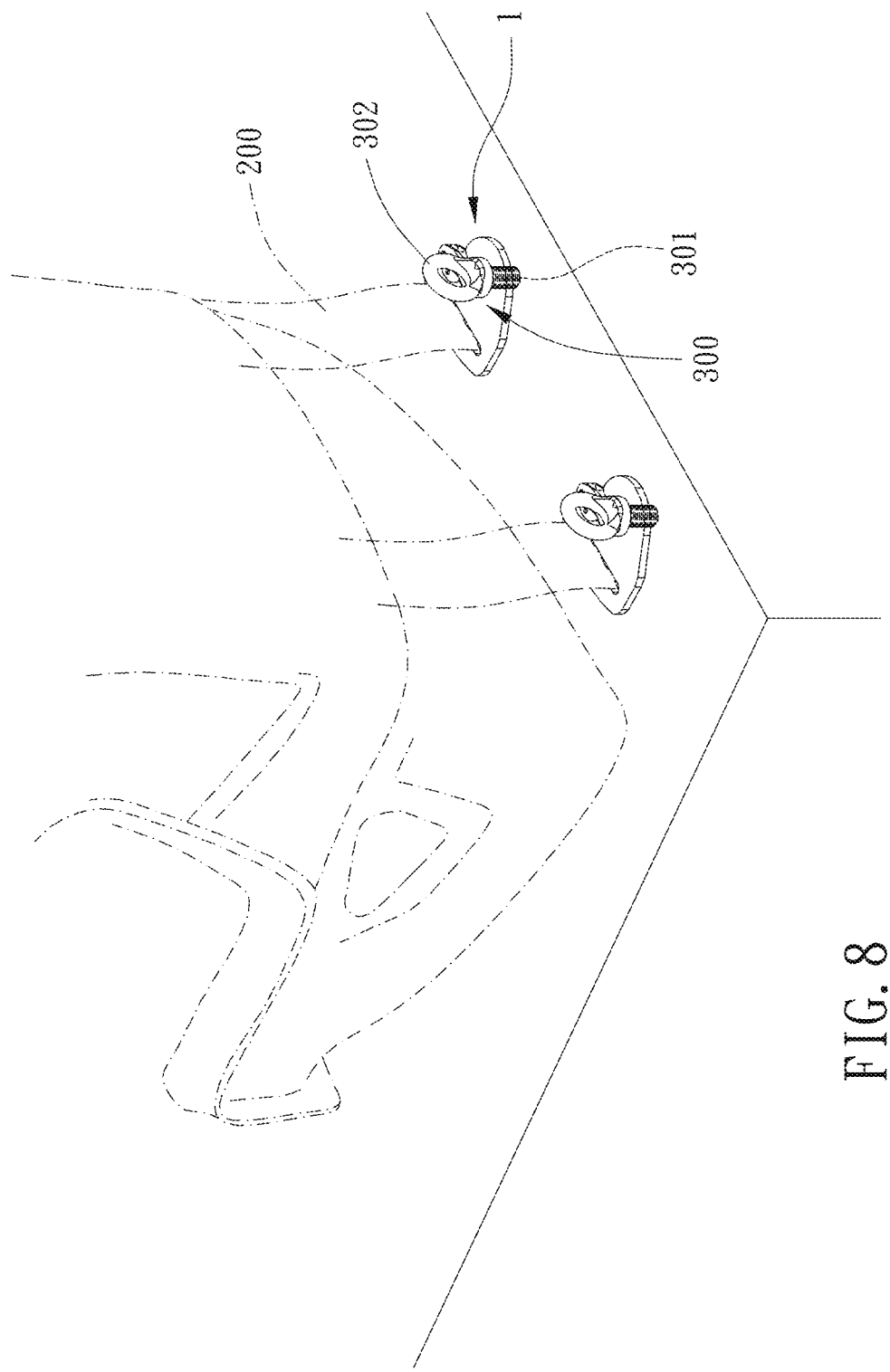
FIGS. 8 and 9 are drawings showing different applications of the seat belt anchor according to an exemplary embodiment of the present invention.
Figure 9:
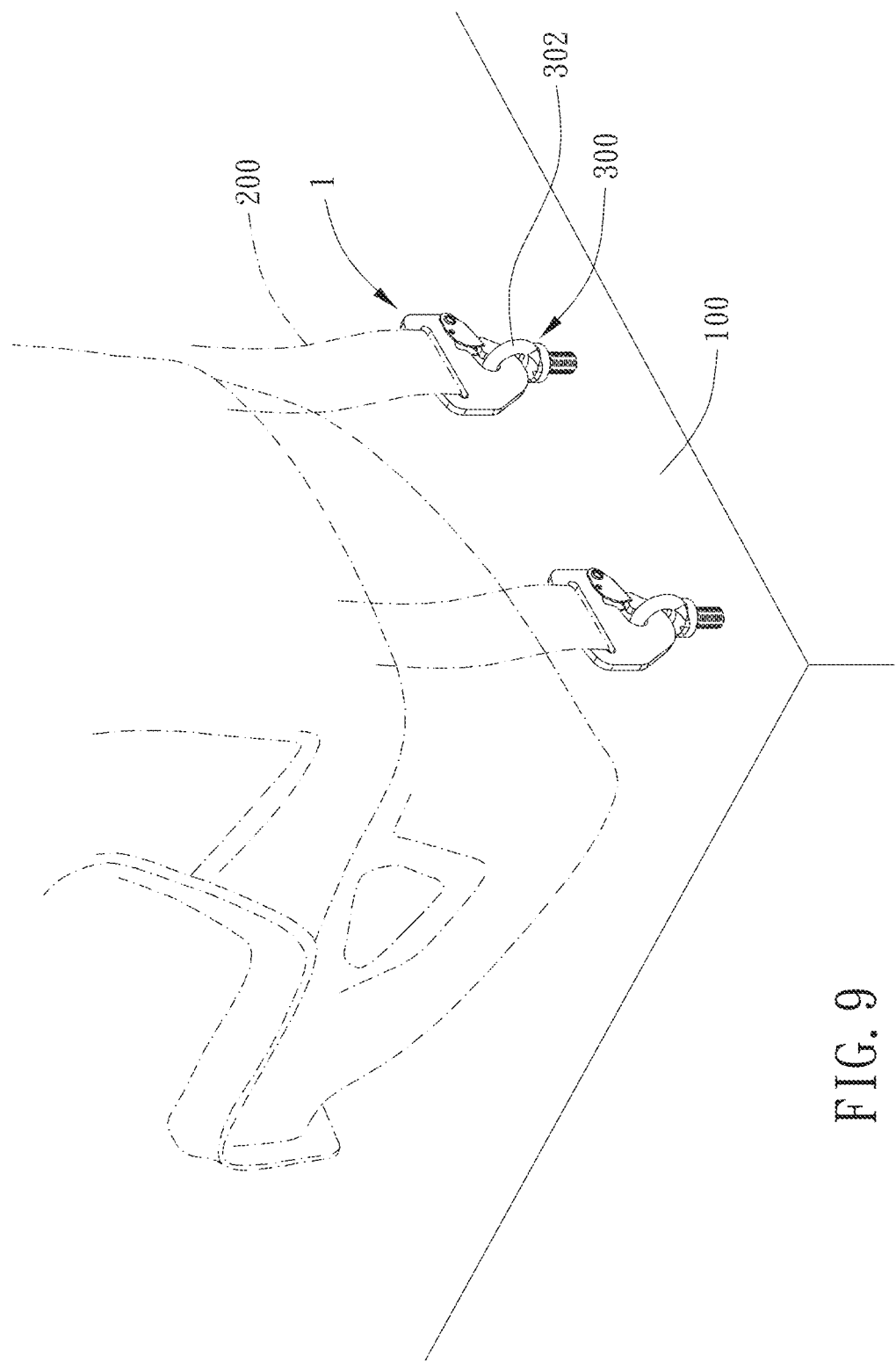

The main body 10 includes a locking slot 11, the locking slot 11 includes an opening 111 opened at a side of the main body 10 and an inner surface 112, and the main body 10 is configured to be mounted on a vehicle floor 100 and to be connected to a seat belt 200. The locking member 20 is movably connected to the main body 10 and movable between a lock position (FIGS. 4 and 6) and a release position (FIGS. 5 and 7). When the locking member 20 is in the lock position, the locking member 20 projects toward the locking slot 11 to define a distance D between the inner surface 112 of the locking slot 11 and the locking member 20 which is larger than a diametric dimension of a shaft body 301 of the fastener 300 so that it allows the shaft body 301 of the fastener 300 to axially pass through the locking slot 11 (FIG. 8). When the locking member 20 is in the release position, it allows a ring body 302 of the fastener 300 to directly pass through the opening 111 to be in the locking slot 11 (FIG. 9). Whereby, the seat belt 200 anchor 1 can be mounted to the vehicle floor 100 though either of two different mounting mechanisms, which has high compatibility of application.

The main body 10 further includes a stop surface 12 and a recess 13. When the locking member 20 is in the lock position, the locking member 20 abuts against the stop surface 12. Preferably, the locking member 20 includes a notch 21, and the stop surface 12 is located within the notch 21, which can stably restrict the locking member 20 and prevent unexpected disengagement. The locking member 20 further includes a convex surface 22 extending in a direction from the recess 13 toward the stop surface 12, and thus the locking member 20 can be urged and biased toward the stop surface 12, thus ensuring that the locking member 20 is effectively and reliably retained in the lock position. Specifically, the locking member 20 further includes a straight surface 23 connected to the convex surface 22, and when the locking member 20 is in the lock position, the straight surface 23 extends from the convex surface 22 toward the stop surface 12. The straight surface 23 provides a good and stable support to the fastener 300. Preferably, the main body 10 further includes a necked portion 14 located between a deep of the locking slot 11 and the opening 111. The necked portion 14 can block the shaft body 301 of the fastener 300 to radially pass out of the locking slot 11.

In this embodiment, the locking member 20 is a U-shaped plate member and saddled on the main body 10 so that the locking member 20 can be stably connected to the main body 10 and stably move relative to the main body 10. The locking member 20 is rotatably and resiliently connected to the main body 10, for example, an elastic member 30 is abutted between the main body 10 and the locking member 20 to bias the locking member 20 toward the lock position, which provides easy and quick installation/uninstallation of the fastener 300 and auto-lock function. The stop surface 12 faces the recess 13, and an edge of the notch 21 is movable to abut against a concave surface 131 of the recess 13. As such, it can provide a passageway with a dimension as large as possible for the ring body 302 of the fastener 300 to pass. Preferably, the stop surface 12 extends obliquely and taperedly from the opening 111 inwards the deep of the locking slot 11, which is conducive to guiding the ring body 302 of the fastener 300 to move into the locking slot 11 smoothly and quickly.

The locking member 20 may further include at least one through hole 24 which is disposed through the locking member 20 in a direction parallel to a direction which the locking member 20 is rotatable about. A member may be engaged in the at least one through hole 24 for moving or positioning the locking member 20.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A seat belt anchor including:
   a main body including a locking slot, the locking slot including an opening opened at a side of the main body and an inner surface, the main body being configured to be mounted on a vehicle floor and to be connected to a seat belt; and
   a locking member movably connected to the main body and movable between a lock position and a release position;
   wherein when the locking member is in the lock position, the locking member projects toward the locking slot to define a distance between the inner surface of the locking slot and the locking member which is larger than a diametric dimension of a shaft body of a fastener so that it allows the shaft body of the fastener to axially pass through the locking slot;
   wherein when the locking member is in the release position, it allows a ring body of the fastener to directly pass through the opening to be in the locking slot;
   wherein the main body further includes a stop surface, and when the locking member is in the lock position, the locking member abuts against the stop surface;
   wherein the main body further includes a recess, the locking member includes a notch, and an edge of the notch is movable to abut against a concave surface of the recess.

2. The seat belt anchor of claim 1, wherein the stop surface is located within the notch when the locking member is in the lock position.

3. The seat belt anchor of claim 2, wherein the locking member further includes a convex surface extending in a direction from the recess toward the stop surface.

4. The seat belt anchor of claim 1, wherein the stop surface faces the recess.

5. The seat belt anchor of claim 1, wherein the stop surface extends obliquely from the opening inwards towards an inner surface of the locking slot that is furthest away from the opening of the locking slot.

6. The seat belt anchor of claim 1, wherein the locking member is rotatably and resiliently connected to the main body.

7. The seat belt anchor of claim 1, wherein the main body further includes a necked portion located between an inner surface of the locking slot that is furthest away from the opening of the locking slot and the opening.

8. The seat belt anchor of claim 6, wherein the locking member includes at least one through hole which is disposed through the locking member in a direction parallel to a direction which the locking member is rotatable about.

9. The seat belt anchor of claim 4, wherein the stop surface is located within the notch when the locking member is in the lock position; the locking member includes a convex surface and a straight surface connected to the convex surface; when the locking member is in the lock position, the convex surface extends in a direction from the recess toward the stop surface, and the straight surface extends from the convex surface toward the stop surface; the stop surface extends obliquely from the opening inwards a towards an inner surface of the locking slot that is furthest away from the opening of the locking slot; the locking member is rotatably and resiliently connected to the main body; the locking member includes at least one through hole which is disposed through the locking member in a direction parallel to a direction which the locking member is rotatable about; the locking member is an U-shaped plate member and saddled on the main body.

\* \* \* \* \*